(12) United States Patent
Dill et al.

(10) Patent No.: US 7,207,761 B2
(45) Date of Patent: Apr. 24, 2007

(54) PIN FASTENER FOR ACHIEVING METAL-TO-METAL CONNECTIONS

(75) Inventors: Michael C. Dill, Elk Grove Village, IL (US); Norbert K. Kolodziej, Park Ridge, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/898,756

(22) Filed: Jul. 26, 2004

(65) Prior Publication Data
US 2006/0018732 A1    Jan. 26, 2006

(51) Int. Cl.
*F16B 15/08* (2006.01)

(52) U.S. Cl. ................ 411/450; 411/453; 411/455; 411/499; 411/440

(58) Field of Classification Search ........ 411/440, 411/450, 451.1, 453, 454, 455, 456, 451.4, 411/451.5, 493, 499
See application file for complete search history.

(56) References Cited

U.S. PATENT DOCUMENTS

| | | | |
|---|---|---|---|
| 426,008 A * | 4/1890 | Groff | 411/453 |
| 1,912,222 A * | 5/1933 | Rosenberg | 411/453 |
| 2,111,110 A * | 3/1938 | Deniston, Jr. et al. | 52/483.1 |
| 3,921,495 A | 11/1975 | Braun et al. | |
| 3,977,142 A * | 8/1976 | Dove et al. | 52/363 |
| 4,718,802 A * | 1/1988 | Rockenfeller et al. | 411/421 |
| 4,764,068 A | 8/1988 | Crispell | |
| 5,391,029 A * | 2/1995 | Fardell | 411/452 |
| 5,658,109 A | 8/1997 | Van Allman et al. | |
| 5,749,692 A * | 5/1998 | Kish et al. | 411/453 |
| 6,109,850 A | 8/2000 | Commins | |
| 6,171,042 B1 | 1/2001 | Olvera et al. | |
| 6,478,520 B1 | 11/2002 | Sala | |
| 6,708,821 B2 | 3/2004 | Tucker et al. | |
| 6,805,525 B2 | 10/2004 | Oswald | |
| 2002/0071741 A1 | 6/2002 | Oswald | |

* cited by examiner

*Primary Examiner*—Flemming Saether
(74) *Attorney, Agent, or Firm*—Schwartz & Weinrieb

(57) ABSTRACT

A new and improved fastener for fastening together thin gauge sheet metal components comprises a forwardly extending pointed tip portion having a tangent ogive configuration so as to facilitate the fast and accurate penetration of the fastener into and through the thin gauge sheet metal components without causing any excessive enlargement of the apertures formed therein, and a shank portion which comprises a lower, spiral thread shank portion which continues to facilitate the ease of penetration of the fastener into and through the thin gauge sheet metal components, and at the same time causes a mating thread to effectively be extruded within the thin gauge sheet metal components so as to effectively develop or generate enhanced surface areas or regions for ultimate contact with an upper shank portion of the fastener when the fastener is fully driven and seated within the thin gauge sheet metal components. The upper shank portion comprises a plurality of axially contiguous, annular flute members having oppositely disposed or oriented faces for facilitating the penetration of the fastener into and through the apertured thin gauge sheet metal members, and for engaging the annular rim regions of the thin gauge sheet metal members, which surround the apertures formed therewithin, so as to significantly enhance the clamping forces and pull-out resistance values of the fastener with respect to the thin gauge sheet metal members. The fasteners are uniquely adapted for securing together vertically oriented stud members and horizontally oriented track members of wall grids or framework structures.

18 Claims, 3 Drawing Sheets

PIN FASTENER FOR ACHIEVING METAL-TO-METAL CONNECTIONS

FIELD OF THE INVENTION

The present invention relates generally to fasteners for connecting, attaching, or fastening different structural components to each other, and more particularly to a new and improved fastener which has been specifically developed in accordance with the principles and teachings of the present invention in order to readily, easily, and quickly achieve the connection, attachment, or fastening together of metal stud members to metal track members during the construction, installation, or erection of, for example, room wall members within residential, commercial, or industrial building structures, wherein the unique and novel structure characteristic of the present invention fastener comprises a forwardly extending pointed tip portion having a tangent ogive configuration or shape so as to facilitate the fast and accurate penetration of the fastener into and through the thin gauge sheet metal components without causing any excessive enlargement of the holes or apertures formed or defined therein, and a shank portion which comprises a lower, spiral thread shank portion which continues to facilitate the ease of penetration of the fastener into and through the thin gauge sheet metal components, as initiated by means of the tangent ogive-configured pointed tip portion, and at the same time causes a mating thread to be effectively extruded within the thin gauge sheet metal components so as to effectively develop or generate enhanced surface areas or regions for ultimate contact with the upper shank portion when the fastener is fully driven and seated within the thin gauge sheet metal components, and lastly, the upper shank portion which comprises a plurality of axially spaced, annular flute members having oppositely disposed or oriented faces for facilitating the penetration of the fastener into and through the apertured thin gauge sheet metal members, and for engaging the annular rim regions of the thin gauge sheet metal members, which surround the apertures formed therewithin, so as to significantly enhance the clamping forces and pull-out resistance values of the fastener with respect to the thin gauge sheet metal members.

BACKGROUND OF THE INVENTION

Various different type of tools, and various different types of fasteners, are of course well known and utilized within the building industry in order to accomplish various different construction, installation, or erection operations or procedures, such as, for example, the construction or erection of interior or exterior wall stud frameworks, grids, matrices, or the like, and the installation of interior wall board members onto such interior or exterior wall stud frameworks, grids, matrices, or the like. Interior or exterior wall stud frameworks, grids, matrices, or the like, comprise, for example, a lower track member which may be fabricated from wood or relatively thin gauge sheet metal and which is adapted to be fixedly attached or secured to a floor member which is often fabricated from concrete, an upper track member which may likewise be fabricated from wood or relatively thin gauge sheet metal and which is adapted to be fixedly attached or secured to ceiling members which often comprise wooden beams or joists, or concrete slabs, or the like, and a plurality of stud members which are adapted to be disposed in vertical planes so as to effectively define support structure for the vertically oriented interior or exterior wall board members which will therefore, in turn, define the interior or exterior wall structures. The stud members may also be fabricated from relatively thin gauge sheet metal or wood and are adapted to be fixedly attached or secured to the upper and lower track members. The stud members may extend vertically so as to be disposed perpendicular to the upper and lower track members, and they may also extend at angular or parallel orientations with respect to the upper and lower track members so as to effectively define cross-bracing within the stud frameworks, grids, or matrices, or the like.

It can therefore be readily appreciated, depending upon the particular members, comprising the overall stud matrix, framework, grid, or the like, that are to be fixedly attached or secured together, that various different material-to-material connections or interfaces will be defined and will therefore embody various different installation parameters, characteristics, techniques, and the like. For example, it can be appreciated that when the lower track members are to be fixedly attached or secured to the floor member, wood-to-concrete or sheet metal-to-concrete material-to-material connections or interfaces will be defined, whereas when the upper track members are to be fixedly attached or secured to the ceiling members, wood-to-wood, sheet metal-to-wood, or sheet metal-to-concrete material-to-material connections or interfaces will be defined. Still further, when the stud members are to be fixedly attached or secured to the upper and lower track members, wood-to-wood, sheet metal-to-wood, wood-to-sheet metal, or sheet-metal-to-sheet metal material-to-material connections or interfaces will be defined. Accordingly, it can be appreciated still further that, in view of the various different material-to-material connections or interfaces defined between the various different structural members comprising or defining the overall stud framework, grid, matrix, or the like, various different power tools, characterized, for example by means of various different power levels, and various different fasteners, characterized, for example, by various different structural features, will be used in order to fixedly attach or secure the various different structural members together.

More particularly, it is to be noted further, in connection with the fixation or the securing of various different structural members to other different structural members, such as, for example, the fixation or the securing of the relatively thin gauge sheet metal upper and lower track members to the floor and ceiling members, as well as the fixation or the securing of the relatively thin gauge sheet metal studs to the relatively thin gauge sheet metal upper and lower track members, that various different options are available to construction and installation personnel, operators, workmen, or the like, in connection with the particular tools and fasteners to be selected in order to in fact perform or achieve the installation, construction, or erection of the aforenoted interior or exterior wall structure frameworks, grids, matrices, or the like, comprising such upper and lower track members, and the interconnected stud members. For example, different tools are currently available upon the market which are powered by means of different power sources and which generate different power levels, that is, the tools may comprise gas or combustion-powered tools, pneumatically-powered tools, powder technology tools, electrically-powered tools, and the like. In addition, different fasteners are currently available upon the market which are designed to be used in conjunction with particularly powered tools or implements. For example, various different nails, brads, pins, or the like, may be utilized as a result of being installed by means of suitable nail guns, or the like, or alternatively, various different threaded screw-type fasteners may be utilized as a result of being installed by means of suitable rotary drive tools.

Important criteria to be considered in connection with the selection of specific tools and fasteners for performing, accomplishing, and achieving particular installation, construction, or erection operations, comprise the speed and ease of installation of the fasteners, the pull-out resistance of the fasteners, and the maintenance of the structural integrity of the various different structural components comprising the framework, grid, or matrix. Speed of installation is an important factor because enhanced speed of installation directly affects a contractor's labor costs. Ease of installation is likewise an important factor because facilitating the installation of the fasteners is less fatiguuing for the installation or construction personnel, operators, or workmen. Structural integrity of the various different structural components comprising the framework, grid, or matrix is submitted to be self-evident in that if the structural integrity of the various different structural components defining or comprising the framework, grid, or matrix is in fact compromised during installation, construction, or erection of the framework, grid, or matrix, then the structural integrity and service life of the resulting framework, grid, or matrix would obviously be adversely or deleteriously affected.

These factors are particularly important in connection with the installation of relatively thin gauge sheet metal structural components. The reason for this is that it is relatively difficult to properly install fasteners within relatively thin gauge sheet metal structural components, such as, for example, the relatively thin gauge sheet metal studs and the relatively thin gauge sheet metal upper and lower track members, so as to install and connect the relatively thin gauge sheet metal upper and lower track members to the floor and ceiling members, as well as to install and connect the relatively thin gauge sheet metal studs to the relatively thin gauge sheet metal upper and lower track members. When, for example, fasteners are installed within relatively thin gauge sheet metal components by means of suitable nail-type installation guns or the like, care must be taken to properly control the power level of the installation tools. More particularly, if the power level of the installation tool is too low, the fasteners will not be able to be properly driven into the relatively thin-gauge sheet metal comprising the stud and track members. Alternatively, if the power level of the installation tool is too high, the relatively thin gauge sheet metal structural components may be damaged, and in addition, the holes generated within the relatively thin gauge sheet metal components may be overly large whereby the holding strength and pull-out resistance of the fasteners will be significantly compromised.

Accordingly, a need exists in the art for a new and improved fastener for attaching relatively thin gauge sheet metal stud members to relatively thin gauge sheet metal track members in a relatively fast and easy manner without adversely or deleteriously affecting the structural integrity of the relatively thin gauge sheet metal stud members or the relatively thin gauge sheet metal track members, and while concomitantly enhancing and preserving the clamping forces and pull-out resistance of the fasteners with respect to the relatively thin gauge sheet metal stud and track members.

SUMMARY OF THE INVENTION

The foregoing and other objectives are achieved in accordance with the teachings and principles of the present invention through the provision of a new and improved fastener which comprises a forwardly extending pointed tip portion having a tangent ogive configuration or shape so as to facilitate the fast and accurate penetration of the fastener into and through the thin gauge sheet metal components without causing any excessive enlargement of the holes or apertures formed or defined therein, and a shank portion which comprises a lower, spiral thread shank portion which continues to facilitate the ease of penetration of the fastener into and through the thin gauge sheet metal components, as initiated by means of the tangent ogive-configured pointed tip portion, and at the same time causes a mating thread to effectively be extruded within the thin gauge sheet metal components so as to effectively develop or generate enhanced surface areas or regions for ultimate contact with the upper shank portion when the fastener is fully driven and seated within the thin gauge sheet metal components. An upper shank portion comprises a plurality of axially contiguous, annular flute members having oppositely disposed or oriented faces for facilitating the penetration of the fastener into and through the apertured thin gauge sheet metal members, and for engaging the annular rim regions of the thin gauge sheet metal members, which surround the apertures formed therewithin, so as to significantly enhance the clamping forces and pull-out resistance values of the fastener with respect to the thin gauge sheet metal members.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
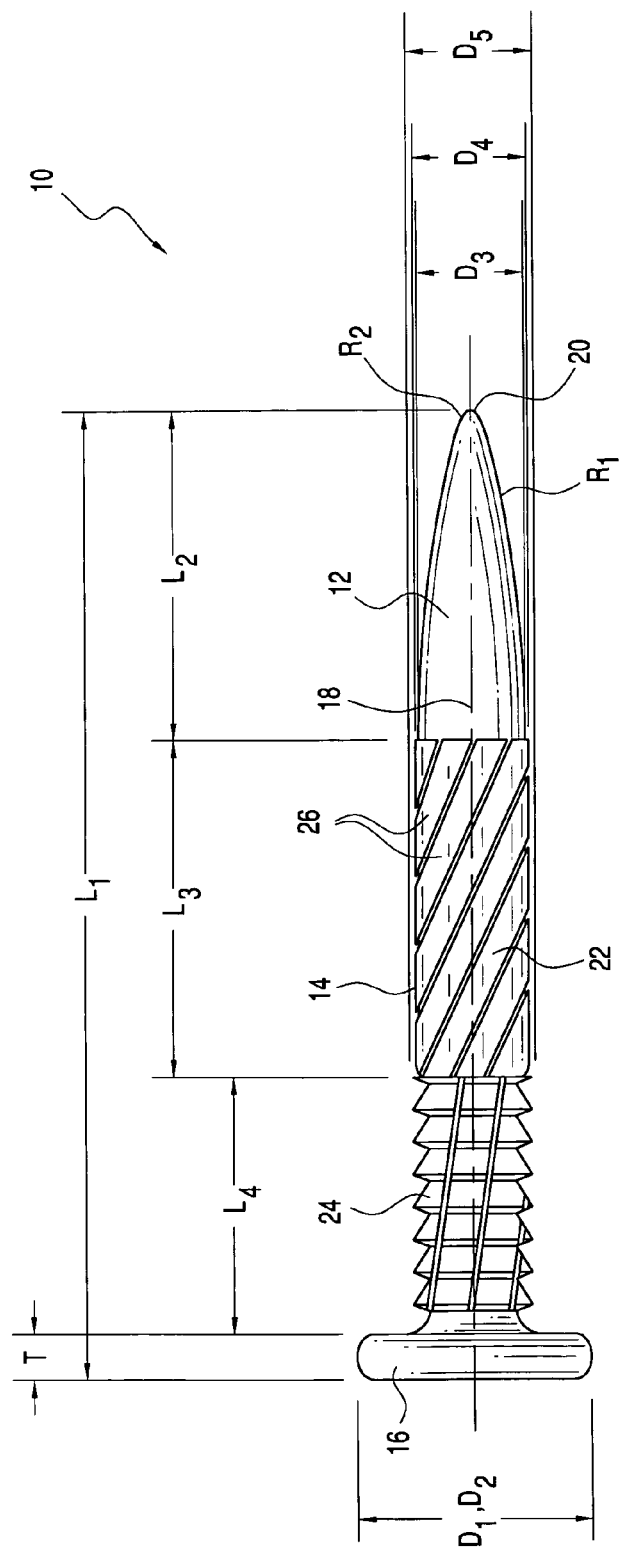
FIG. 1 is an enlarged side elevational view of a new and improved fastener, constructed in accordance with the principles and teachings of the present invention and illustrating the cooperative parts thereof, which is uniquely adapted for insertion into thin gauge sheet metal members so as to secure thin gauge sheet metal members together, such as, for example, vertically oriented thin gauge sheet metal wall stud members to horizontally oriented, upper and lower thin gauge sheet metal track members, so as to form, for example, framework structures onto which wall boards are to be secured.
Figure 2:
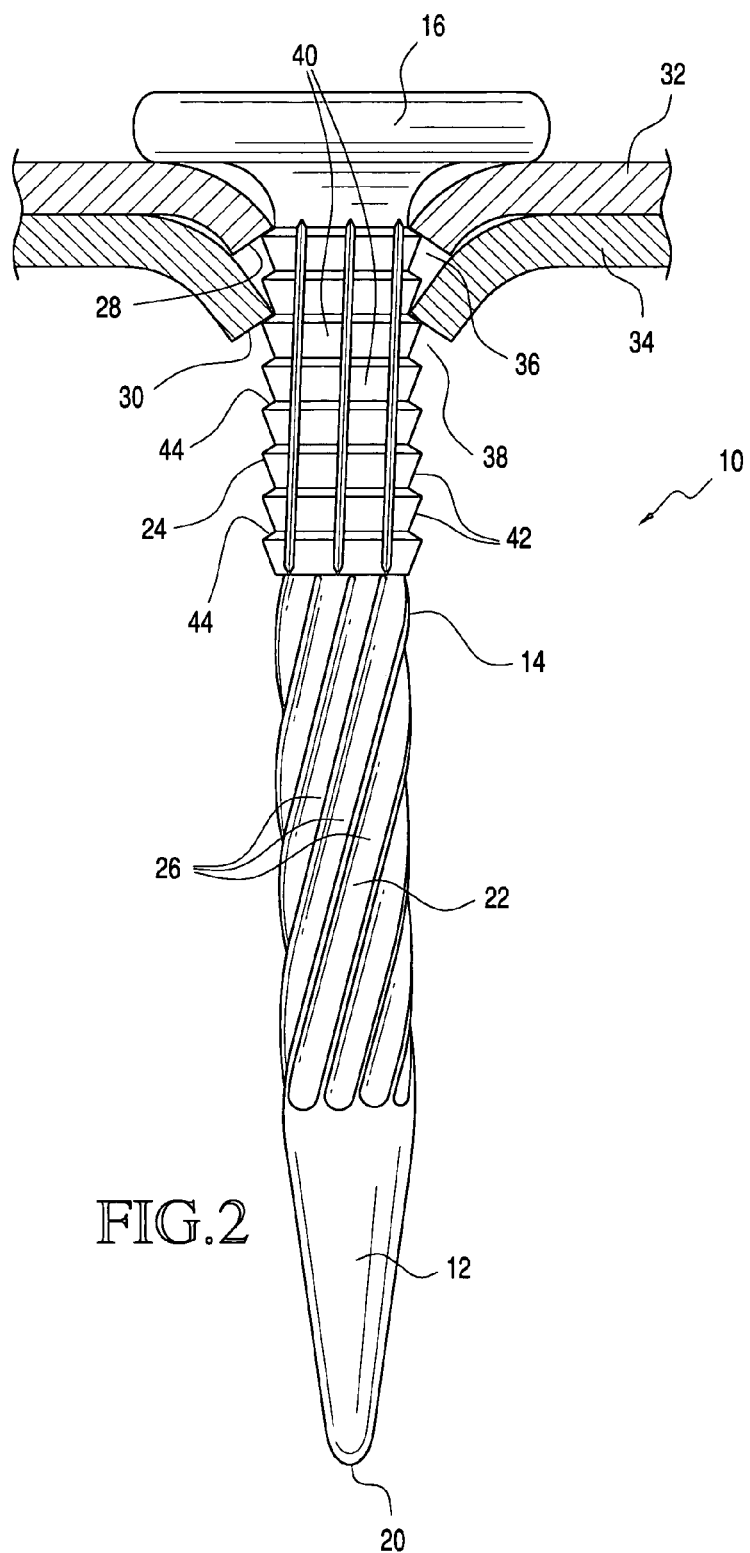
FIG. 2 is an enlarged side elevational view of the new and improved fastener, as disclosed within FIG. 1, wherein the new and improved fastener is illustrated as being inserted into and mounted within a pair of overlapping thin gauge sheet metal members which may comprise, for example, vertically oriented thin gauge sheet metal wall stud members and horizontally oriented, upper and lower thin gauge sheet metal track members, so as to form, for example, framework structures onto which wall boards are to be secured.

Referring now to the drawings, and more particularly to FIGS. 1 and 2 thereof, a new and improved fastener, constructed in accordance with the principles and teachings of the present invention, and showing the cooperative parts thereof, is disclosed and is generally indicated by the reference character 10. More particularly, the new and improved fastener 10 is seen to comprise a forwardly disposed pointed end portion 12, an intermediate shank portion 14, and a head portion 16, all formed or defined around a longitudinal axis 18. The forwardly disposed pointed end portion 12 is seen to have an ogive shape or configuration, which may either be that of a secant ogive or a tangent ogive, and in connection with the actual fabrication techniques for forming or manufacturing the ogive-shaped forwardly disposed pointed end portion 12 of the fastener 10, such techniques, as well as the actual steel chemical composition, the Rockwell hardness values, and the like, for forming or manufacturing the fastener 10 of the present invention may be similar to those as disclosed within either U.S. Pat. No. 6,171,042 which issued to Olvera et al. on Jan. 9, 2001, or U.S. Pat. No. 5,658,109 which issued to Van Allman et al. on Aug. 19, 1997, both patent disclosures being incorporated herein by reference. In particular, it is seen that the ogive-shaped forwardly disposed pointed end portion 12 of the fastener 10 is defined by means of a external surface portion which has a radius $R_1$ of approximately 1.25 inches (1.25"), and that the tip portion 20 of the ogive-shaped forwardly disposed pointed end portion 12 of the fastener 10 comprises a spherical configuration having a radius $R_2$ of approximately 0.010 inches (0.010").

By providing the forwardly disposed pointed end portion 12 of the fastener 10 with the ogive shape or configuration, the fast and accurate penetration of the fastener into and through the thin gauge sheet metal components, without causing any excessive enlargement, distortion, tearing, or other destruction of the holes or apertures formed or defined therein, is facilitated. It is further noted that the fastener 10 can be used in connection with various thin gauge sheet metal structures which may vary in thickness dimensions between, for example, 20 gauge (0.036 inches) and 12 gauge (0.105 inches). Still further, the new and improved fastener 10 of the present invention may be utilized within different power-driven tools, such as, for example, pneumatically driven tools or gas-powered tools. In conjunction with the usage of the fastener within such different tools, it is noted that the head portion 16 may have a thickness dimension T which may be within the range of 0.035–0.050 inches (0.035–0.050"), however, in order to operatively cooperate with the different driver structure characteristic of such pneumatically driven and gas-powered tools, the diametrical extent $D_1$ of the head portion 16 is preferably within the range of 0.315–0.320 inches (0.315–0.320") when the fastener 10 is to be used within a pneumatically driven tool, whereas when the fastener 10 is to be used within a gas-powered tool, the diametrical extent $D_2$ of the head portion 16 is preferably within the range of 0.215–0.250 inches (0.215–0.250"). Still yet further, it is noted that the overall length $L_1$ of the fastener 10, as extending from the upper or external surface of the head portion 16 to the tip portion 20, is within the range of 0.970–1.005 inches (0.970–1.005"), and that the length $L_2$ of the pointed end portion 12 of the fastener 10 is within the range of 0.285–0.325 inches (0.285–0.325"). Lastly, it is noted that the diametrical extent $D_3$ of the pointed end portion 12 of the fastener 10 is within the range of 0.097–0.102 inches (0.097–0.102").

Continuing further, it is noted that the intermediate shank portion 14 of the fastener 10 comprises a forwardly disposed spiral-threaded shank portion 22 which is integrally connected at the forward end portion thereof to the pointed end portion 12 of the fastener 10, and a rearwardly disposed annularly fluted shank portion 24 which is interposed between the spiral-threaded shank portion 22 and the head portion 16 of the fastener 10. The forwardly disposed spiral-threaded shank portion 22 comprises a plurality of spiral threads 26 which are disposed at an angle of approximately 30° with respect to the longitudinal axis 18 of the fastener 10, and it is noted that the purpose of providing such spiral threads 26 upon the shank portion 22 of the fastener 10 which is disposed immediately upstream or rearwardly of the pointed end portion 12 of the fastener 10 so as to be interposed between the pointed end portion 12 of the fastener 10 and the annularly fluted shank portion 24 of the fastener 10 is to effectively extrude and thereby form mating thread forms within the annular walls or rim portions 28, 30 of the thin gauge sheet metal components or structures 32, 34 which effectively define or surround the apertures 36, 38 previously formed within the thin gauge sheet metal components or structures 32, 34 by means of the pointed end portion 12 of the fastener 10, as can best be appreciated from FIG. 2.

As a result of the formation of the mating thread forms within the annular wall or rim portions 28, 30 of the thin gauge sheet metal components or structures 32, 34, it can be appreciated that in lieu of a truly circular locus defined within the aforenoted annular walls or rim portions 28, 30 of the thin gauge sheet metal components or structures 32, 34, the mating thread forms effectively comprise a plurality of circumferentially arranged peaks and valleys. In this manner, a larger total surface area is effectively defined upon the aforenoted annular walls or rim portions 28, 30 of the thin gauge sheet metal components or structures 32, 34 for a purpose to be disclosed shortly hereinafter. It is lastly noted that the spiral-threaded shank portion 22 has an external diametrical extent $D_4$ which is preferably within the range of 0.105–0.110 inches (0.105–0.110"), the axial or longitudinal length dimension $L_3$ of the spiral-threaded shank portion 22 is preferably within the range of 0.300–0.350 inches (0.300–0.350"), and still further, it is noted that the spiral-threaded shank portion 22 is tapered outwardly over its longitudinal or axial extent, as one proceeds in the direction extending from the pointed end portion 12 of the fastener 10 toward the annularly fluted shank portion 24, by means of 0.002 inches (0.002"). Such an upward or rearwardly oriented outward taper provided upon the spiral-threaded shank portion 22 of the fastener 10 results in the generation of a slight wedging effect or enhanced contact to be constantly or continuously developed between the spiral-threaded 22 of the fastener 10 and the annular walls or rim portions 28, 30 of the thin gauge sheet metal components or structures 32, 34 so as to effectively ensure the development or creation of the mating thread forms within the annular walls or rim portions 28, 30 of the thin gauge sheet metal components or structures 32, 34.

Lastly, in connection with the rearwardly disposed annularly fluted shank portion 24 of the fastener 10, it is seen that the annularly fluted shank portion 24 of the fastener 10 comprises a plurality of axially contiguous annular stepped flute members 40, and it is to be particularly appreciated that the structure of each one of the plurality of axially contiguous annular stepped flute members 40 comprises specific structure which uniquely adapts the fastener 10 of the present invention for its use in connection with the thin gauge sheet metal components or structures 32, 34. It is initially noted that the rearwardly disposed annularly fluted shank portion 24 of the fastener 10 has an axial or longitudinal length dimension $L_4$ which is within the range of 0.300–0.330 inches (0.300–0.330"), and that the diametrical extent $D_5$ of such rearwardly disposed annularly fluted shank portion 24 of the fastener 10 is within the range of 0.110–0.115 inches (0.110–0.115"). More significantly, however, as can best be appreciated from FIGS. 1 and 2, it is additionally seen that each one of the plurality of axially contiguous annular stepped flute members 40 comprises a first annular face 42 which is sloped or inclined at a predetermined angle of, for example, 65° with respect to and toward the longitudinal axis 18 of the fastener 10 in the forward direction, and a second annular face 44 which is sloped or inclined at a predetermined angle of, for example, 15° with respect to and toward the longitudinal axis 18 of the fastener 10 in the rearward direction, wherein the forward end portion of each one of the forward, radially inwardly inclined annular faces 42 terminates at the rearward end portion of a respective one of the rearward, radially inwardly inclined annular faces 44 such that each one of the rearward, radially inwardly inclined annular faces 44 effectively defines an annular step or shoulder portion.

As may therefore be additionally appreciated from FIG. 2, when the new and improved fastener 10, constructed in accordance with the principles and teachings of the present invention, is inserted through the pair of thin gauge sheet metal components or structures 32, 34 so as to fixedly secure the pair of thin gauge sheet metal structures of components 32, 34 together, the plurality of forward, radially inwardly inclined annular faces 42 of the rearwardly disposed annularly fluted shank portion 24 of the fastener 10 will effectively ratchet past the annular walls or rim portions 28, 30 of the thin gauge sheet metal components or structures 32, 34 whereupon the annular walls or rim portions 28, 30 of the thin gauge sheet metal structures or components 32, 34 will ultimately be seated upon particular ones of the rearward, radially inwardly inclined annular faces 44 of the rearwardly disposed annularly fluted shank portion 24 of the fastener 10 as is clearly illustrated within FIG. 2. In this manner, such engaged interaction, defined between the annular walls or rim portions 28, 30 of the thin gauge sheet metal components or structures 32, 34, and the particular ones of the rearward, radially inwardly inclined annular faces 44 of the rearwardly disposed annularly fluted shank portion 24 of the fastener 10, serves to effectively secure and lock the fastener 10 within the thin gauge sheet metal structures or components 32, 34 such that the fastener 10 exhibits a significantly high pull-out resistance value with respect to the thin gauge sheet metal structures or components 32, 34.

In addition, as has been noted hereinbefore, the initial insertion of the fastener 10 into the pair of thin gauge sheet metal structures or components 32, 34 results in a repetitive ratcheting of the plurality of forward, radially inwardly inclined annular faces 42 of the rearwardly disposed annularly fluted shank portion 24 of the fastener 10 past the annular walls or rim portions 28, 30 of the thin gauge sheet metal components or structures 32, 34. Such ratcheting action will, in turn, cause the annular walls or rim portions 28, 30 of the thin gauge sheet metal components or structures 32, 34 to repetitively flex in the axial forward direction and then resiliently return to their normal, non-deflected positions. In this manner, not only are the annular walls or rim portions 28, 30 of the thin gauge sheet metal structures or components 32, 34 seated upon the particular ones of the annular shoulder or stepped portions 44 of the rearwardly disposed annularly fluted shank portion 24 of the fastener 10, but in addition, the resilient return of the annular walls or rim portions 28, 30 of the thin gauge sheet metal structures or components 32, 34 to their non-deflected positions also causes the annular walls or rim portions 28, 30 of the thin gauge sheet metal structures or components 32, 34 to effectively engage the forward end portions of two of the forward, radially inwardly inclined annular faces 42 of the fastener 10 so as to effectively cause the fastener 10 to move axially rearwardly ever so slightly whereby a relatively tight clamped engagement is developed between the particular ones of the annular shoulder or stepped portions 44 of the rearwardly disposed annularly fluted shank portion 24 of the fastener 10 and the annular walls or rim portions 28, 30 of the thin gauge sheet metal structures or components 32, 34. In this manner, the pull-out resistance value of the fastener 10, with respect to the annular walls or rim portions 28, 30 of the thin gauge sheet metal components or structures 32, 34, is additionally enhanced.

Still yet further, it is to be additionally appreciated that as a result of both of the annular walls or rim portions 28, 30 of the thin gauge sheet metal components or structures 32, 34 effectively engaging, for example, two of the annular shoulder or stepped portions 44 of the rearwardly disposed annularly fluted shank portion 24 of the fastener 10, the aforenoted clamping forces, locking forces, and pull-out resistance forces are significantly enhanced, particularly in connection with the thinner gauge sheet metals where relatively small amounts of surface-to-surface contact are normally defined between the annular walls or rim portions 28, 30 of the thin gauge sheet metal components or structures 32, 34 and the shank portion per se of a typical fastener. In other words, in addition to the normal or conventional sliding coefficient of friction, as defined between the annular walls or rim portions 28, 30 of the thin gauge sheet metal components or structures 32, 34 and the shank portion per se of the fastener, determining or playing the major role in the pull-out resistance values or characteristics of the fastener, in accordance with the teachings and principles of the present invention, the pull-out resistance values or characteristics are additionally defined, and significantly enhanced in connection with particular thin gauge sheet metal components, by means of the actual axially aligned abutment contact defined between the walls or rim portions 28, 30 of the thin gauge sheet metal components or structures 32, 34 and the annular shoulder or stepped portions 44 of the rearwardly disposed annularly fluted shank portion 24 of the fastener 10.

It is additionally noted that in connection with the interaction or interengagement defined between the annular walls or rim portions 28, 30 of the thin gauge sheet metal structures or components 32, 34 and the annular shoulder or stepped portions 44 of the rearwardly disposed annularly fluted shank portion 24 of the fastener 10, the number of axially contiguous annular stepped flute members 40 provided upon the rearwardly disposed annularly fluted shank portion 24 of the fastener 10 may comprise, for example, thirty-four threads per inch (34 tpi) whereby each one of the axially contiguous annular stepped flute members 40 will have a predetermined axial length, however, the number of such axially contiguous annular stepped flute members 40, and the corresponding axial length of each one of the axially contiguous annular stepped flute members 40, may be varied or adapted to properly interengage the annular walls or rim portions 28, 30 of the thin gauge sheet metal structures or components 32, 34 as a function of the particular thickness gauge of the thin gauge sheet metal components or structures 32, 34 being employed. It is lastly to be remembered that as a result of the initial insertion of the fastener 10 into and through the thin gauge sheet metal components or structures 32, 34, the spiral thread portion 22 of the fastener 10 caused corresponding thread forms to be formed within the annular walls or rim portions 28, 30 of the thin gauge sheet metal components or structures 32, 34 whereby such inner annular walls or rim portions 28, 30 of the thin gauge sheet metal components or structures 32, 34 would effectively exhibit increased surface area values. Accordingly, it is to be further appreciated that such increased surface area values also serve to optimally engage the annular shoulder or stepped portions 44 of the fastener 10 so as to further increase or enhance the pull-out resistance value of the fastener 10.

Figure 3:
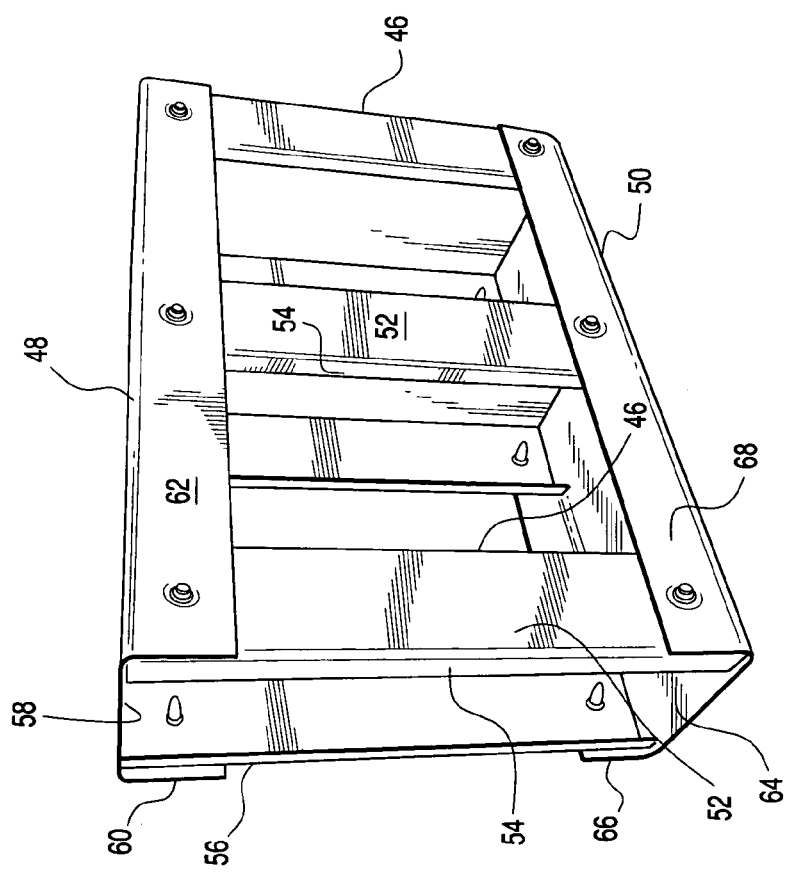
FIG. 3 is a perspective view of a framework structure, for a wall system, comprising upper and lower, horizontally oriented thin gauge sheet metal track members, and a plurality of vertically oriented thin gauge sheet metal stud members fastened to the upper and lower horizontally oriented thin gauge sheet metal track members by means of the new and improved fasteners of the present invention, as disclosed within FIGS. 1 and 2, for interconnecting the upper and lower horizontally oriented thin gauge sheet metal track members together.

With reference being lastly and briefly made to FIG. 3, it is to be additionally appreciated that the new and improved fastener 10 of the present invention is particularly useful in connection with the attachment or securing together of different types of thin gauge sheet metal components or structures, such as, for example, the attachment of vertically oriented stud members 46 to upper and lower, horizontally oriented track members 48, 50 in connection with the erection or installation of, for example, interior or exterior wall framework grids or structures. Each one of the vertically oriented stud members 46, as well as each one of the horizontally oriented track members 48, 50, is fabricated from thin gauge sheet metal and has a substantially U-shaped cross-sectional configuration. For example, it is clearly seen that each one of the vertically oriented stud members 46 comprises a base or web member 52, and a pair of side members 54, 56 extending substantially perpendicular thereto. In a similar manner, the upper track member 48 comprises a base or web member 58, and a pair of dependent side members 60, 62 extending substantially perpendicular thereto, while the lower track member 50 comprises a base or web member 64, and a pair of upstanding side members 66, 68 extending substantially perpendicular thereto. The vertically oriented stud members 46 are adapted to be disposed internally within the upper and lower track members 48, 50 such that the oppositely disposed vertical end portions of the stud members 46 are seated upon the inner faces of the base or web members 58, 64 of the upper and lower track members 48, 50, while the external surface portions of the base or web members 52 of the stud members 46 are disposed in contact with the interior surfaces of the dependent side members 60, 62 of the upper track member 48, as well as being disposed in contact with the interior surfaces of the upstanding side members 66, 68 of the lower track member 50. The fasteners 10 of the present invention can then be utilized to securely fasten or connect the vertically oriented stud members 46 to the upper and lower track members 48, 50 as a result of the passage of the fasteners 10 through the upstanding side members 66, 68 of the lower track member 50 and the lower end portions of the base or web members 52 of the stud members 46, as well as the passage of the fasteners 10 through the dependent side members 60, 62 of the upper track member 48 and the upper end portions of the base or web members 52 of the stud members 46.

Thus, it may be seen that in accordance with the teachings and principles of the present invention, there has been provided a new and improved fastener which comprises a forwardly extending pointed tip portion having a tangent ogive configuration or shape so as to facilitate the fast and accurate penetration of the fastener into and through the thin gauge sheet metal components without causing any excessive enlargement of the holes or apertures formed or defined therein, and a shank portion which comprises a lower, spiral thread shank portion which continues to facilitate the ease of penetration of the fastener into and through the thin gauge sheet metal components, as initiated by means of the tangent ogive-configured pointed tip portion, and at the same time causes a mating thread to effectively be extruded within the thin gauge sheet metal components so as to effectively develop or generate enhanced surface areas or regions for ultimate contact with an upper shank portion of the fastener when the fastener is fully driven and seated within the thin gauge sheet metal components.

The upper shank portion comprises a plurality of axially contiguous, annular flute members having oppositely disposed or oriented faces for facilitating the penetration of the fastener into and through the apertured thin gauge sheet metal members, and for engaging the annular rim regions of the thin gauge sheet metal members, which surround the apertures formed therewithin, so as to significantly enhance the clamping forces and pull-out resistance values of the fastener with respect to the thin gauge sheet metal members. The fasteners are uniquely adapted for securing together vertically oriented stud members and horizontally oriented track members of wall grids or framework structures.

Obviously, many variations and modifications of the present invention are possible in light of the above teachings. While the disclosure has been directed toward the fastening together of a pair of thin gauge sheet metal members, it is envisioned that the fastener of the present invention can be utilized to fasten together more than two thin gauge sheet metal members. It is therefore to be understood that within the scope of the appended claims, the present invention may be practiced otherwise than as specifically described herein.

What is claimed as new and desired to be protected by Letters Patent of the United States of America, is:

1. A fastener for fastening a pair of thin gauge sheet metal members together, comprising:
   a pointed end portion for forming apertures within the thin gauge sheet metal members as said fastener is inserted through the thin gauge sheet metal members;
   a head portion; and
   a shank portion interposed between said pointed end portion and said head portion and defined around a longitudinal axis;
   wherein said shank portion comprises a spiral-threaded shank portion disposed immediately upstream of said pointed end portion and comprising a plurality of spiral threads disposed at a predetermined angle with respect to said longitudinal axis of said shank portion for forming corresponding threads upon annular wall portions of the thin gauge sheet metal members, which surround the apertures defined within the thin gauge sheet metal members, as a result of the insertion of said pointed end portion of said fastener through the thin gauge sheet metal members, and an annularly fluted shank portion disposed immediately upstream of said spiral-threaded shank portion so as to be interposed between said spiral-threaded shank portion and said head portion and comprising a plurality of axially contiguous annular stepped flute members for engaging the annular wall portions of the thin gauge sheet metal members which surround the apertures defined within the thin gauge sheet metal members so as to effectively lock said fastener within the thin gauge sheet metal members and enhance the pull-out resistance of said fastener with respect to the thin gauge sheet metal members so as to securely fasten the thin gauge sheet metal members together, and wherein each one of said plurality of axially contiguous annular stepped flute members, for engaging the annular wall portions of the thin gauge sheet metal members which surround the apertures defined within the thin gauge sheet metal members so as to effectively lock said fastener within the thin gauge sheet metal members and enhance the pull-out resistance of said fastener with respect to the thin gauge sheet metal members so as to thereby securely fasten the thin gauge sheet metal members together, comprises a first, axially forward, radially inwardly inclined annular face for facilitating the axial insertion of said annularly fluted shank portion of said fastener past the annular wall portions of the thin gauge sheet metal members, and a second axially rearward, oppositely oriented, radially inwardly inclined annular face for defining a stepped, shoulder portion upon which one of the annular wall portions of the thin gauge sheet metal members is adapted to be seated so as to lockingly secure said fastener within the thin gauge sheet metal members and readily prevent pull-out of said fastener with respect to the thin gauge sheet metal members and thereby securely fasten the thin gauge sheet metal members together, wherein the axially forward end portion of each one of said first, axially forward, radially inwardly inclined annular faces is disposed in contact with the axially rearward end portion of one of said second axially rearward, oppositely oriented, radially inwardly inclined annular faces so as to define said plurality of axially contiguous annular stepped flute members.

2. The fastener as set forth in claim 1, wherein:

said pointed end portion of said fastener has an ogive configuration.

3. The fastener as set forth in claim 2, wherein:

said ogive configuration is selected from the group comprising a tangent ogive and a secant ogive.

4. The fastener as set forth in claim 1, wherein:

said spiral-threaded shank portion comprising said plurality of spiral threads, disposed at a predetermined angle with respect to said longitudinal axis of said shank portion, are disposed at an angle of approximately 30° with respect to said longitudinal axis of said shank portion.

5. The fastener as set forth in claim 1, wherein:

each one of said axially forward radially inwardly inclined annular faces, of said plurality of axially contiguous annular stepped flute members of said annularly fluted shank portion, is disposed in a forwardly disposed radially inwardly inclined manner and at a predetermined angle with respect to said longitudinal axis of said shank portion of said fastener; and each one of said axially rearward radially inwardly inclined annular faces, of said plurality of axially contiguous annular stepped flute members of said annularly fluted shank portion, is disposed in a rearwardly disposed radially inwardly inclined manner and at a predetermined angle with respect to said longitudinal axis of said shank portion of said fastener.

6. The fastener as set forth in claim 5, wherein:.

said predetermined angle, at which each one of said axially forward radially inwardly inclined annular faces of said plurality of axially contiguous annular stepped flute members of said annularly fluted shank portion is disposed in said forwardly disposed radially inwardly inclined manner with respect to said longitudinal axis of said shank portion of said fastener, comprises approximately 65° so as to facilitate the axial insertion of said annularly fluted shank portion of said fastener past the annular wall portions of the thin gauge sheet metal members; and said predetermined angle, at which each one of said axially rearward radially inwardly inclined annular faces of said plurality of axially contiguous annular stepped flute members of said annularly fluted shank portion is disposed in said rearwardly disposed radially inwardly inclined manner with respect to said longitudinal axis of said shank portion of said fastener, comprises approximately 15° so as to define said stepped, shoulder portion upon which one of the annular wall portions of the thin gauge sheet metal members is adapted to be seated so as to lockingly secure said fastener within the thin gauge sheet metal members.

7. The fastener as set forth in claim 1, wherein:

a pair of said axially rearward, radially inwardly inclined annular faces together define a pair of stepped, shoulder portions upon which both of the annular wall portions of the thin gauge sheet metal members are adapted to be seated so as to effectively double the pull-out resistance forces which lockingly secure said fastener within the thin gauge sheet metal members and readily prevent the withdrawal of said fastener with respect to the thin gauge sheet metal members so as to thereby securely fasten the thin gauge sheet metal members together.

8. In combination, a pair of thin gauge sheet metal members, and a fastener for fastening said pair of thin gauge sheet metal members together, comprising:

a pair of thin gauge sheet metal members; and a fastener for fastening said pair of thin gauge sheet metal members together;

said fastener comprising a pointed end portion for forming apertures within said pair of thin gauge sheet metal members as said fastener is inserted through said pair of thin gauge sheet metal members; a head portion; and a shank portion interposed between said pointed end portion and said head portion and defined around a longitudinal axis;

wherein said shank portion of said fastener comprises a spiral-threaded shank portion disposed immediately upstream of said pointed end portion and comprising a plurality of spiral threads disposed at a predetermined angle with respect to said longitudinal axis of said shank portion for forming corresponding threads upon annular wall portions of said pair of thin gauge sheet metal members, which surround said apertures defined within said pair of thin gauge sheet metal members, as a result of the insertion of said pointed end portion of said fastener through said pair of thin gauge sheet metal members, and an annularly fluted shank portion disposed immediately upstream of said spiral-threaded shank portion so as to be interposed between said spiral-threaded shank portion of said fastener and said head portion of said fastener, and comprising a plurality of axially contiguous annular stepped flute members for engaging said annular wall portions of said pair of thin gauge sheet metal members which surround said apertures defined within said pair of thin gauge sheet metal members so as to effectively lock said fastener within said pair of thin gauge sheet metal members and enhance the pullout resistance of said fastener with respect to said pair of thin gauge sheet metal members so as to securely fasten said pair of thin gauge sheet metal members together, and wherein each one of said plurality of axially contiguous annular stepped flute members, for engaging the annular wall portions of the thin gauge sheet metal members which surround the apertures defined within the thin gauge sheet metal members so as to effectively lock said fastener within the thin gauge sheet metal members and enhance the pull-out resistance of said fastener with respect to the thin gauge sheet metal members so as to thereby securely fasten the thin gauge sheet metal members together, comprises a first, axially forward, radially inwardly inclined annular face for facilitating the axial insertion of said annularly fluted shank portion of said fastener past the annular wall portions of the thin gauge sheet metal members, and a second axially rearward, oppositely oriented, radially inwardly inclined annular face for defining a stepped, shoulder portion upon which one of the annular wall portions of the thin gauge sheet metal members is adapted to be seated so as to lockingly secure said fastener within the thin gauge sheet metal members and readily prevent pull-out of said fastener with respect to the thin gauge sheet metal members and thereby securely fasten the thin gauge sheet metal members together, wherein the axially forward end portion of each one of said first, axially forward, radially inwardly inclined annular faces is disposed in contact with the axially rearward end portion of one of said second axially rearward, oppositely oriented, radially inwardly inclined annular faces so as to define said plurality of axially contiguous annular stepped flute members.

9. The combination as set forth in claim 8, wherein:
said pointed end portion of said fastener has an ogive configuration.

10. The combination as set forth in claim 9, wherein:
said ogive configuration is selected from the group comprising a tangent ogive and a secant ogive.

11. The combination as set forth in claim 8, wherein:
said spiral-threaded shank portion comprising said plurality of spiral threads, disposed at a predetermined angle with respect to said longitudinal axis of said shank portion, are disposed at an angle of approximately 30° with respect to said longitudinal axis of said shank portion.

12. The combination as set forth in claim 8, wherein:
each one of said axially forward radially inwardly inclined annular faces, of said plurality of axially contiguous annular stepped flute members of said annularly fluted shank portion, is disposed in a forwardly disposed radially inwardly inclined manner and at a predetermined angle with respect to said longitudinal axis of said shank portion of said fastener; and each one of said axially rearward radially inwardly inclined annular faces, of said plurality of axially contiguous annular stepped flute members of said annularly fluted shank portion, is disposed in a rearwardly disposed radially inwardly inclined manner and at a predetermined angle with respect to said longitudinal axis of said shank portion of said fastener.

13. The combination as set forth in claim 12, wherein:
said predetermined angle, at which each one of said axially forward radially inwardly inclined annular faces of said plurality of axially contiguous annular stepped flute members of said annularly fluted shank portion is disposed in said forwardly disposed radially inwardly inclined manner with respect to said longitudinal axis of said shank portion of said fastener, comprises approximately 65° so as to facilitate the axial insertion of said annularly fluted shank portion of said fastener past said annular wall portions of said pair of thin gauge sheet metal members; and said predetermined angle, at which each one of said axially rearward radially inwardly inclined annular faces of said plurality of axially contiguous annular stepped flute members of said annularly fluted shank portion is disposed in said rearwardly disposed radially inwardly inclined manner with respect to said longitudinal axis of said shank portion of said fastener, comprises approximately 15° so as to define said stepped, shoulder portion upon which one of said annular wall portions of said pair of thin gauge sheet metal members is adapted to be seated so as to lockingly secure said fastener within said pair of thin gauge sheet metal members.

14. The combination as set forth in claim 8, wherein:
a pair of said axially rearward, radially inwardly inclined annular faces together define a pair of stepped, shoulder portions upon which both of said annular wall portions of said pair of thin gauge sheet metal members are adapted to be seated so as to effectively double the pull-out resistance forces which lockingly secure said fastener within said pair of thin gauge sheet metal members and readily prevent the withdrawal of said fastener with respect to said pair of thin gauge sheet metal members so as to thereby securely fasten said pair of thin gauge sheet metal members together.

15. The combination as set forth in claim 8, wherein:
said pair of thin gauge sheet metal members comrise track and stud members for erecting a wall framework.

16. The combination as set forth in claim 15, wherein:
each one of said track and stud members has a substantially U-shaped cross-sectional configuration comprising a base web member and a pair of side members.

17. The combination as set forth in claim 16, wherein:
base web members of said stud members are fastened to said side members of said track members comprising said wall framework.

18. The combination as set forth in claim 8, wherein:
said gauge thickness of said pair of thin gauge sheet metal members is within the range of 12 gauge and 20 gauge sheet metal members.

* * * * *